(12) United States Patent
Mirov

(10) Patent No.: US 6,782,480 B2
(45) Date of Patent: Aug. 24, 2004

(54) METHOD AND APPARATUS FOR ACCESSING SYSTEM INFORMATION

(75) Inventor: Russell N. Mirov, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 604 days.

(21) Appl. No.: 09/745,976

(22) Filed: Dec. 21, 2000

(65) Prior Publication Data

US 2002/0083350 A1 Jun. 27, 2002

(51) Int. Cl.⁷ .............................. G06F 1/26; G06F 12/00
(52) U.S. Cl. ........................ 713/300; 713/310; 711/103
(58) Field of Search ................................. 713/300, 322, 713/310; 711/103; 365/52; 710/38, 62

(56) References Cited

U.S. PATENT DOCUMENTS

| | | | | |
|---|---|---|---|---|
| 4,785,425 A | * | 11/1988 | Lavelle | 365/52 |
| 5,261,055 A | * | 11/1993 | Moran et al. | 710/38 |
| 5,428,748 A | * | 6/1995 | Davidson et al. | 710/9 |
| 5,469,557 A | * | 11/1995 | Salt et al. | 711/103 |
| 5,473,758 A | * | 12/1995 | Allen et al. | 711/103 |
| 5,669,003 A | * | 9/1997 | Carmean et al. | 713/322 |
| 5,802,268 A | * | 9/1998 | Fisher et al. | 714/25 |
| 6,256,226 B1 | * | 7/2001 | Fujita | 365/185.05 |
| 6,513,128 B1 | * | 1/2003 | Wang et al. | 713/600 |

FOREIGN PATENT DOCUMENTS

| JP | 06-342329 | * 12/1994 |
|---|---|---|
| JP | 2000-208567 | * 7/2000 |

OTHER PUBLICATIONS

James Edwin Vinson, "Circuit Reliability of Memory Cells with SEU Protection", IEEE Transactions on Nuclear Science, vol. 39 No. 6, Dec. 1992, pp 1671–1678.*

* cited by examiner

Primary Examiner—Thomas Lee
Assistant Examiner—Chun Cao
(74) Attorney, Agent, or Firm—Meyertons Hood Kivlin Kowert & Goetzel, P.C.

(57) ABSTRACT

An option module that may be installed in a computer system is provided. The option module includes functional circuitry that is accessed by the computer system through a conventional connector and/or bus. A nonvolatile memory is also included on the option module and is used to store a variety of system information, such as serial numbers. At least a portion of this system information is protected from alteration by the computer system. A second connector is also provided on the option module. An external device when coupled to the second connector may access all of the system data, and, if desired, alter it. Moreover, the option module need not be installed in the computer system for the external device to access the contents of the memory through the second connector.

12 Claims, 2 Drawing Sheets

METHOD AND APPARATUS FOR ACCESSING SYSTEM INFORMATION

BACKGROUND OF THE INVENTION

1. Field of the Invention

This invention relates generally to method and apparatus for accessing system information stored within an electronic device, and, more particularly, to a method and apparatus for accessing system information without installing or powering up the electronic device.

2. Description of the Related Art

It has become relatively commonplace for electronic devices, such as components of a computer system, to include a nonvolatile memory that may be used to store significant system data, such as serial numbers, revision information, usage information, failure histories, and the like. Owing to the nature of the nonvolatile memory, this information remains available irrespective of whether the electronic device has an uninterrupted source of electrical power. That is, power outages and the like will not cause the electronic device to lose its serial number, revision information, etc.

Such information may be accessed to determine warranty issues, to identify the product, to analyze failures, and the like. In a computer system, the information is commonly accessed with the component installed and the computer system operating using standard busses, ports, etc. Thus, the information is available to a user of the computer system, and may be intentionally or accidentally altered. Once the data is corrupted, it may be difficult or even impossible to recreate.

Further, since the information is typically only available with the computer system operating, servicing an uninstalled component may require that it first be installed in a computer system. Installing a component, particularly a malfunctioning component, can be a time consuming and difficult process. Further, depending on the type of malfunction, the data stored in the nonvolatile memory may exist but be otherwise unavailable because the malfunction may impede access to the nonvolatile memory.

The present invention is directed to overcoming, or at least reducing the effects of, one or more of the problems set forth above.

SUMMARY OF THE INVENTION

In one aspect of the present invention, a method for accessing information stored in a memory of a device is provided. The method comprises providing power to the memory, preventing power from being delivered to a select portion of the device, and accessing data stored in the memory.

In another aspect of the present invention, a method for operating a device is provided. The method is comprised of a first and second mode of operation. In the first mode of operation, the device receives power and signals over a first connection. The first mode of operation includes the device storing system information in a first preselected location in a memory on the device. The device is prevented from accessing a second preselected location in the memory during the first mode of operation. In the second mode of operation, only the memory receives power and signals over a second connection. The second mode of operation includes the memory being enabled to access to both the first and second preselected locations through the second connection.

In another aspect of the instant invention, a device is provided. The device comprises a first and second connector, functional circuitry, a memory, and a high impedance device. The functional circuitry is coupled to the first connector and adapted to receive electrical power and signals over the first connector. The memory is coupled to the first and second connectors and adapted to receive electrical power and signals over both the first and second connectors. The high impedance device is positioned between the functional circuitry and the second connector to prevent substantial current from flowing to the functional circuitry.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
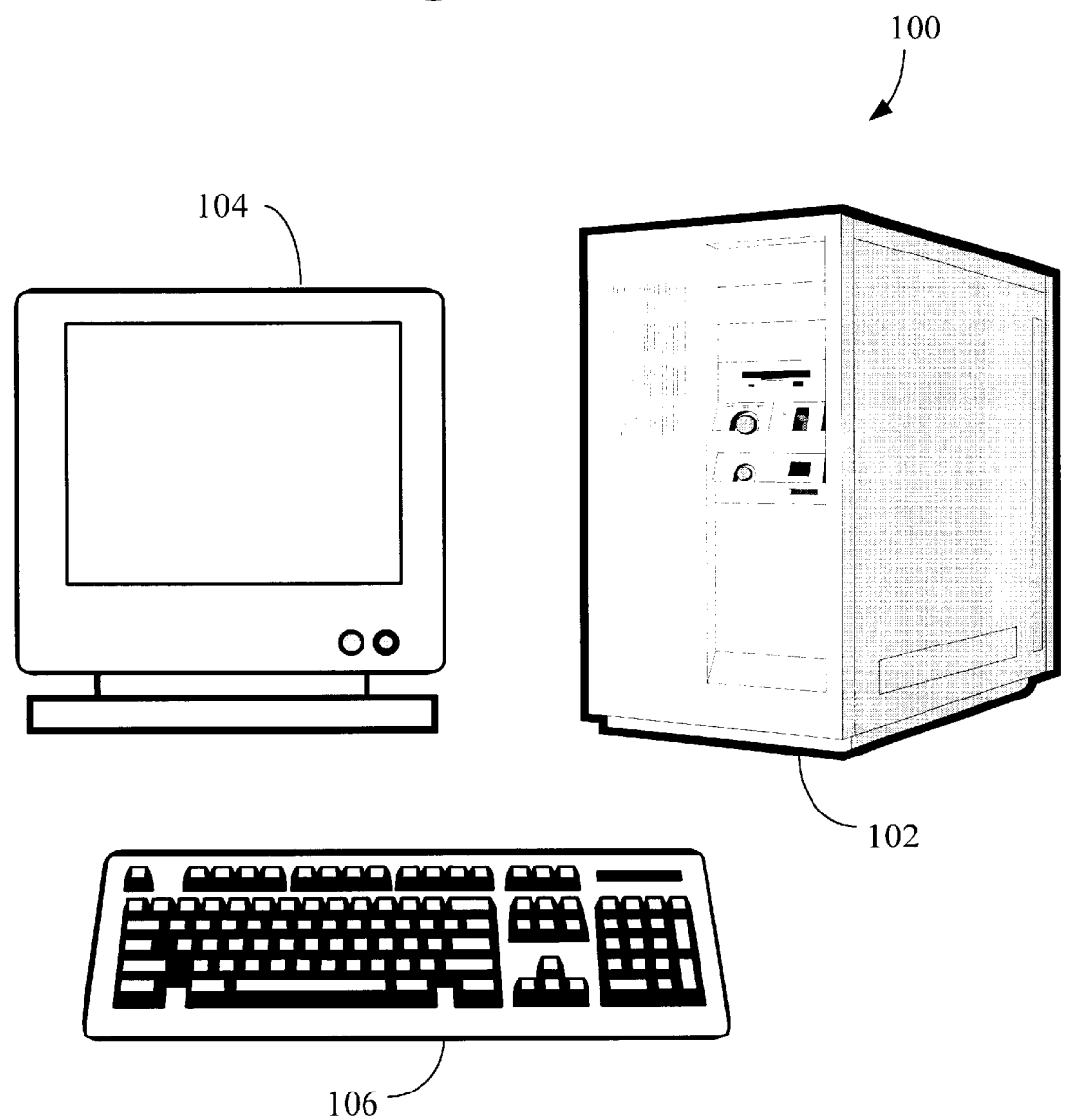
FIG. 1 illustrates a stylized representation of a computer system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
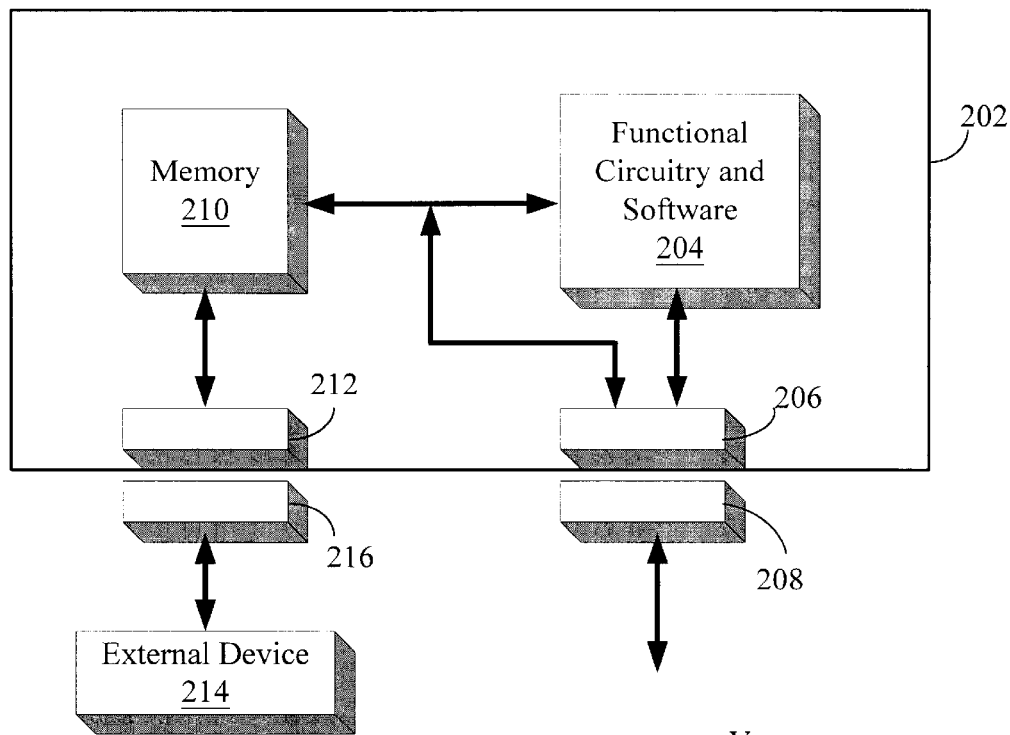
FIG. 2 schematically illustrates a block diagram of one embodiment of an option module that may be employed in the computer system of FIG. 1.
Figure 3:
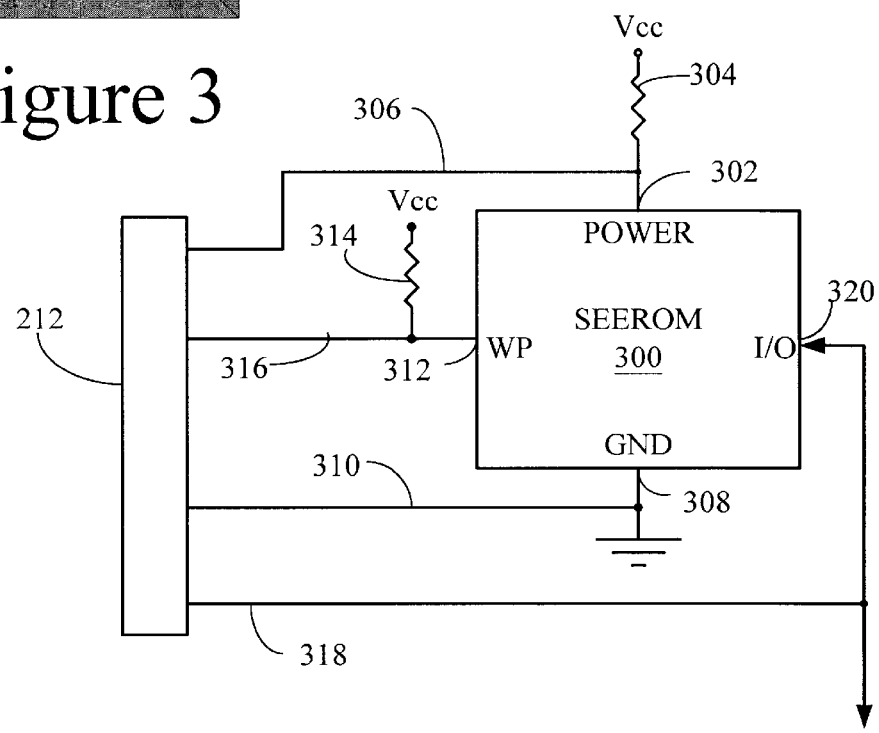
FIG. 3 schematically illustrates a schematic diagram of one embodiment of an option module that may be employed in the computer system of FIG. 1.

Illustrative embodiments of a method and apparatus for accessing system information stored in a nonvolatile memory is illustrated in FIGS. 1–3. As will be readily apparent to those skilled in the art upon a complete reading of the present application, the present method and apparatus may find application in a wide variety of electronic systems, such as a computer system, a control system, data acquisition equipment, and the like. Moreover, the instant invention may be used on virtually any device that employs a nonvolatile memory as a method and apparatus for accessing information stored in the nonvolatile memory. For purposes of illustrating the instant invention only, the invention will be discussed in the context of a computer system. While a specific embodiment of a computer system is illustrated in FIGS. 1–3, those skilled in the art will appreciate that the instant invention may be employed in a variety of computer systems other than the embodiment illustrated herein.

Turning now to FIG. 1, an exemplary computer system 100 is illustrated. Generally, the computer system 100 is comprised of a chassis 102, a monitor 104, and an input device 106, which interact to form a personal computer, a workstation, a mini computer, or the like. Generally, the chassis 102 houses a plurality of components or peripheral devices, such as a hard disk drive, a floppy disk drive, a compact disk drive, a mother board with a microprocessor installed thereon, a video interface card, and the like. Generally, the microprocessor operates under software control to receive input signals from the input device 106 and provide signals representative of graphic images to the monitor 104 for display thereon.

The computer system 100 may be general purpose in nature in that it may provide any of a wide variety of functions, depending upon the software that is executed by the microprocessor and upon the availability of optional hardware devices. That is, the functionality of the computer system 100 may be further expanded by the addition of optional hardware components that are intended to provide specific functionality to the computer system 100. Typically, the hardware components take the form of a printed circuit board or module that is installed in the chassis 102, interfacing with other components in the chassis 102 via conventional busses or connectors. Typically, the module receives electrical power and delivers and receives electrical signals, such as data, address, and clock signals over the bus or connector. For example, the computer system 100 may be used to play music by the addition of hardware components, such as a sound module. Similarly, the computer system 100 may interface with digital cameras through an optional interface module. Further, the computer system 100 may use a communication module to communicate with a network of other computer systems, such as on the world wide web. The communication module may comprise a modem or network interface card (NIC). The instant invention may also find application in a central processing unit (CPU) module, a memory module, or the like.

A block diagram of an exemplary option module 200 that may be installed in the computer system 100 is illustrated in FIG. 2. Generally, the option module 200 is comprised of a printed circuit board 202 with functional circuitry and firmware 204 mounted thereon. The functional circuitry and firmware 204 comprises the elements used to supply the desired functionality of the option module 200. That is, the functional circuitry and firmware 204 represents the resources located on, for example, an audio module to produce audio signals that may be delivered to speakers, which would permit the computer system 100 to produce sound. Likewise, in the case of a modem, the functional circuitry and firmware 204 represents the resources that act as an interface between a plain old telephone system (POTS) and the computer system 100 to allow communications therebetween.

The option module 200 includes a connector 206 that is electrically coupled with the functional circuitry and firmware 204. The connector 206 on the option module 200 may be physically coupled with a connector 208 within the computer system 100. Thus, physically coupling the connectors 206, 208 together provides a physical path through which electrical signals and electrical power may be delivered to the option module 200 from the computer system 100 or vice versa. Commonly, the connectors 206, 208 are coupled together when the option module 200 is installed in the computer system 100.

In some instances, the option module 200 has certain system information that is stored in an electronic memory 210. The system information may include a wide variety of types of data. For example, it may be useful for the option module 200 to have a serial number assigned thereto and stored in the memory 210 for identification and diagnostic purposes. Similarly, it may be useful to store information relevant to an error state in the memory 210 so that it may be later retrieved and analyzed for diagnosing the cause of the erroneous operation. Further, it may be useful to record certain operational information, such as the length of time that the option module has been powered up for warranty purposes.

Usually, it is desirable that this information be alterable but persistent. That is, it may be useful for the information to be stored in the memory 210 such that it will remain in the memory 210 despite the computer system 100 being powered down, or even if the option module 200 is removed from the computer system 100. Moreover, it may be useful to prevent information stored in the memory from being accessed or otherwise altered by the computer system 100. For example, in the event that information relevant to a warranty on the option module 200 is stored in the memory 210, then the information should be protected from being altered by a user of the computer system 100. Likewise, in the case of a NIC, a Ethernet media access controller (MAC) address may be stored in the memory 210, but should not be alterable by the user of the computer system 100.

Accordingly, a second connector 212 is provided on the option module 200. The second connector 212 provides a physical interface to the memory 210 so that an external device 214 may be coupled thereto through a connector 216. The external device 214 may take on any of a variety of forms, such as a desktop computer, a handheld device, a laptop computer, a custom service tool, or the like. In any event, the external device 214 may be used to retrieve data from the memory 210 for warranty, diagnostic or other purposes. Alternatively, the external device 214 may be permitted to alter at least some of the information stored in the memory 210.

In one embodiment discussed in greater detail below, the memory 210 on the option module 200 may be accessed by the external device 214 with the option module 200 removed from the computer system 100. In this mode of operation, electrical power is supplied to the memory 210 over the connector 212 by the external device 214. Moreover, in one embodiment, the memory 210 may be accessed by the external device 214 without powering up the functional circuitry and firmware 204 located on the option module 200.

FIG. 3 illustrates an exemplary schematic diagram of one embodiment of the memory 210 of the option module 200. In the illustrated embodiment, the memory 210 includes a serial electrically erasable programmable read only memory (SEEPROM) 300, such as is commercially available from Amtel as part number 24C64, from Xicor, and from others. Those skilled in the art will appreciate that any of a variety of nonvolatile memories may be readily substituted for the SEEPROM 300 without departing from the spirit and scope of the instant invention.

The SEEPROM 300 includes a power input terminal 302, which is coupled to a voltage source $V_{cc}$ through a resistor 304. During normal operation of the option module 200 within the computer system 100, the voltage source $V_{cc}$ is supplied by the computer system 100 to the option module 200 through the connectors 206, 208. Generally, the voltage source Vcc is supplied to components throughout the option module 200. That is, the functional circuitry and firmware 204 likewise receives the voltage source $V_{cc}$ during normal operation. However, when the computer system 100 is powered down, or when the optional module 200 is removed from the computer system 100, the voltage source $V_{cc}$ is not available. The external device 214, however, may provide an operating voltage to the power input terminal 302 via the connectors 212, 216 and a line 306 that extends between the connector 212 and the power input terminal 302.

In the mode of operation where power is being supplied by the external device 214, the resistor 304 prevents the functional circuitry and firmware 204 from being powered up. That is, the resistor 304 is selected to have a sufficiently high ohmic value such that only a very small current would be available to flow from the line 306, through the resistor 304, and into the voltage source $V_{cc}$. By keeping the current sufficiently small, the functional circuitry and firmware 204 will not be activated. For example, in one embodiment the voltage supplied by the external device 214 is about +3.3V volts, and the resistor 304 is about 100 ohms, which would result in a maximum current of only about 33 mA flowing to the voltage source $V_{cc}$. By sizing the resistor 304 appropriately, current flowing into the voltage source $V_{cc}$ may be maintained below a level sufficient to operate the functional circuitry and firmware 204.

It should be appreciated that during normal operation, the voltage source $V_{cc}$ should supply sufficient current through the resistor 304 to allow the SEEPROM 300 to operate properly. Accordingly, the value of the resistor 304 should be selected within a range to allow sufficient current to flow to the SEEPROM 300 during normal operation, but prevent sufficient current to flow to the functional circuitry and firmware 204 during times when the power is being supplied solely by the external device 214. During normal operation where the computer system 100 provides electrical power via the voltage source $V_{cc}$, the SEEROM 300 draws only a small fraction of a milliamp of current. Thus, the voltage drop across the resistor 304 is only a small fraction of a volt.

The SEEPROM 300 also includes an electrical ground terminal 308. During normal operation, a ground signal is supplied by the computer system 100 via the connectors 206, 208. During times when the power is being supplied solely by the external device 214, a ground signal is supplied to the ground terminal 308 by the external device 214 via the connectors 212, 216 and a line 310.

The SEEPROM 300 also includes a write-protect (WP) terminal 312, which is coupled through a resistor 314 to the voltage source $V_{cc}$. Thus, during normal operation where the computer system 100 is supplying power to the voltage source $V_{cc}$, the WP terminal 312 is pulled to a logically high level, which prevents data from being written to or stored in select locations in the SEEPROM 300. That is, certain data, such as the serial number of the option module 200, should not be modified by the computer system 100. The connection to the voltage source $V_{cc}$ through the resistor 314 ensures that the computer system 100 cannot modify at least those locations protected by a logically high signal on the WP terminal 312.

However, during initialization, or later during maintenance, this unmodifiable data must be stored in the SEEPROM 300. The external device 214 can store the desired data in the otherwise protected locations in the SEEPROM 300 through the connectors 212, 216. A line 316 extends from the connector 212 to the WP terminal 312 of the SEEPROM 300. Thus, the external device 214 may controllably pull the WP terminal 312 to a logically high or low level, as desired to permit reading and writing of the protected memory locations in the SEEPROM 300 over a line 318 coupled between the connector 212 and an input/output (I/O) terminal 320. For example, the external device may read the protected locations in the SEEPROM 300 by pulling the line 316 to a logically low level and then accessing the I/O terminal 320 with an appropriate addressing scheme.

On the other hand, when the external device 214 does not intend to change the contents of the protected memory locations in the SEEPROM 300, then the WP terminal is pulled to a logically high level. Like the resistor 304, the resistor 314 is selected to have a sufficiently high ohmic value such that only a very small current would be available to flow from the line 316, through the resistor 314, and into the voltage source $V_{cc}$. By keeping the current sufficiently small, the functional circuitry and firmware 204 will not be activated. For example, in one embodiment the voltage supplied by the external device 214 is about +3.3 volts, and the resistor 314 is about 10000 ohms, which would result in a maximum current of only about 0.33 mA flowing to the voltage source $V_{cc}$. By sizing the resistor 314 appropriately, current flowing into the voltage source $V_{cc}$ may be maintained below a level sufficient to operate the functional circuitry and firmware 204.

The external device 214 may operate to read and/or write the contents of the SEEPROM 300 without the option module 200 being installed in the computer system 100, and thus, without the option module 200 receiving power from the computer system 100. In this manner, the option module 200 may be readily updated or analyzed without installing an uninstalled option module 200. Thus, the instant invention provides substantial flexibility in accessing, modifying and otherwise using the memory 210 on the option module 200.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for accessing information stored in a memory of a device, comprising:

provdiding power to the memory, wherein the memory includes protected memory locations and unprotected memory locations, wherein the memory further includes a write protect terminal to restrict access to the protected memory locations;

entering a first mode of operation when the memory and functional circuitry are powered up via a first connector;

entering a second mode of operation when the memory is powered up via a second connector;

inhibiting access to the protected memory locations during the first mode of operation; and allowing access to the protected memory locations only during the second mode of operation;

wherein a high impedance device is coupled between the functional circuitry and the second connector to prevent the functional circuitry from being powered up during the second mode of operation.

2. A method, as set forth in claim 1, wherein the second connector includes an input/output line coupled to the memory and wherein data stored in the memory is accessible through the second connector.

3. A method, as set forth in claim 1, wherein the second connector includes a write protect line coupled to the write protect terminal of the memory.

4. A method, as set forth in claim 3, wherein a signal is provided to the write protect terminal of the memory via the write protect line of the second connector to control the accessing of the protected memory locations during the second mode of operation.

5. A method, as set forth in claim 1, wherein a second high impedance device is coupled between the functional circuitry and the second connector to prevent the functional circuitry from being powered up during the second mode of operation.

6. A method for operating a device, comprising:
providing power to a memory, wherein the memory includes protected memory locations and unprotected memory locations, wherein the memory further includes a write protect terminal to restrict access to the protected memory locations;
entering a first mode of operation when the memory and functional circuitry are powered up via a first connector;
entering a second mode of operation when the memory is powered up via a second connector, wherein the functional circuitry is not powered up during the second mode of operation;
inhibiting access to the protected memory locations during the first mode of operation; and
allowing access to the protected memory locations only during the second mode of operation.

7. An apparatus, comprising:
a first connector;
functional circuitry coupled to the first connector;
a second connector; and
a memory coupled to the first and second connectors, wherein the memory includes protected memory locations and unprotected memory locations, wherein the memory further includes a write protect terminal to restrict access to the protected memory locations;
wherein the apparatus is configured to enter a first mode of operation when the memory and the functional circuitry are powered up via the first connector;
wherein the apparatus is configured to enter a second mode of operation when the memory is powered up via the second connector, and wherein the functional circuitry is not powered up during the second mode of operation;
wherein access to the protected memory locations is inhibited during the first mode of operation, and wherein access to the protected memory locations is allowed only during the second mode of operation.

8. A device, comprising:
a first connector;
functional circuitry coupled to the first connector;
a second connector;
a memory coupled to the first and second connectors, wherein the memory includes protected memory locations and unprotected memory locations, wherein the memory further includes a write protect terminal to restrict access to the protected memory locations; and
a high impedance device coupled between the functional circuitry and the second connector;
wherein the device is configured to enter a first mode of operation when the memory and the functional circuitry are powered up via the first connector, and wherein the device is configured to enter a second mode of operation when the memory is powered up via the second connector;
wherein the high impedance device prevents the functional circuitry from being powered up during the second mode of operation;
wherein access to the protected memory locations is inhibited during the first mode of operation, and wherein access to the protected memory locations is allowed only during the second mode of operation.

9. A device, as set forth in claim 8, wherein the second connector includes an input/output line coupled to the memory and wherein data stored in the memory is accessible through the second connector.

10. A device, as set forth in claim 8, wherein the second connector includes a write protect line coupled to the write protect terminal of the memory, wherein a signal is provided via the write protect line of the second connector to control the accessing of the protected memory locations during the second mode of operation.

11. A system, comprising:
a printed circuit board, which comprises:
a first connector;
functional circuitry coupled to the first connector;
a second connector; and
memory coupled to the first and second connectors, wherein the memory includes protected memory locations and unprotected memory locations, wherein the memory further includes a write protect terminal to restrict access to protected memory locations;
wherein the printed circuit board enters a first mode of operation when the memory and the functional circuitry are powered up via the first connector;
wherein the printed circuit board enters a second mode of operation when the memory is powered up via the second connector, and wherein the functional circuitry is not powered up during the second mode of operation;
wherein access to the protected memory locations is inhibited during the first mode of operation, and wherein access to the protected memory locations is allowed only during the second mode of operation.

12. The system of claim 11, further comprising an external device coupled to the printed circuit board via the second connector for providing power to the memory and for accessing the protected and unprotected memory locations during the second mode of operation.

* * * * *